Nov. 10, 1970   D. M. PERRY   3,539,798
SHADOWLESS PROJECTION SYSTEMS
Filed July 18, 1967

DONALD M. PERRY
INVENTOR
BY
BUCKHORN, BLORE, KLARQUIST & SPARKMAN
ATTORNEYS

United States Patent Office 3,539,798
Patented Nov. 10, 1970

3,539,798
SHADOWLESS PROJECTION SYSTEMS
Donald M. Perry, P.O. Box 495, Gresham, Oreg. 97030
Filed July 18, 1967, Ser. No. 654,225
Int. Cl. F21v *13/04*
U.S. Cl. 240—41.3                                    4 Claims

ABSTRACT OF THE DISCLOSURE

In FIG. 1, a compensating lens on the cover glass of a flashlight collimates light from the lamp to fill the portion of the beam which otherwise would be a shadow from the lamp opening in the parabolic reflector of the flashlight. The light from the flashlight travels through a field lens adjacent a transparency and the image of the transparency travels through a projection lens. The compensating lens evens the illumination from one edge of the flashlight beam to the other. In FIG. 2, a compensating lens focused on a light source at one focal point of an elliptical reflector, which has a shadow-creating opening for the light source, focuses the light from the light source through a transparency to the other focal point of the reflector to illuminate the area of the shadow from the opening. A projection lens projects an image of the transparency onto a screen or the like.

DESCRIPTION

This invention relates to shadowless projection systems.

In numerous attempts to develop a simple flashlight projector, even illumination of the slide has been achieved by the addition of a diffusing element between the reflector and the slide. Such diffusing elements include ground glass, opal glass, translucent plastic and other translucent materials, ribbed glass, beaded glass and lenticular plates. Any of these materials waste light to a greater or lesser extent and make it impossible to get adequate light from such a low wattage source. Consequently the picture must be shown on a small screen.

An object of the invention is to provide shadowless projection systems.

Another object of the invention is to provide projection systems having concave mirrors having openings for small light sources and serving to collect and direct the light from the small sources through slides or films which are then imaged by projection lenses on screens.

A further object of the invention is to provide a flashlight projector for use as a teaching aid in underdeveloped countries and areas where no electric current is available. It is also easily portable and self-contained for use where connection to an electric current would be inconvenient.

Another object of this invention is to provide even illumination in projection systems using a small source at the focus of a parabolic reflector or concave reflectors of other conic sections. A model of the present invention gives enough illumination to project successfully the popular 35 mm. color slide on a six-foot beaded glass screen.

The invention provides shadowless projection systems in each of which a concave reflector having an opening for a small light source reflects light with a central shadow to an aperture and a small compensating lens aligned with the opening transmits light from the light source to the shadowed portion of the aperture to cause uniform illumination at the aperture. In one specific embodiment of the invention, a flashlight having a parabolic reflector has on its cover glass a plano convex lens collimating light from a lamp mounted in an opening in the reflector and filling an otherwise shadowed area of a field lens adjacent a transparency. A projection lens projects the light from the transparency on a screen. In a shadowless projection system forming an alternate embodiment of the invention, a small compensating lens focused on a light source at a focal point of an elliptical or ellipsoidal reflector focuses light from the light source through a transparency to the other focal point of the ellipse, which coincides with a projection lens, to illuminate an otherwise shadowed portion.

Figure 1:
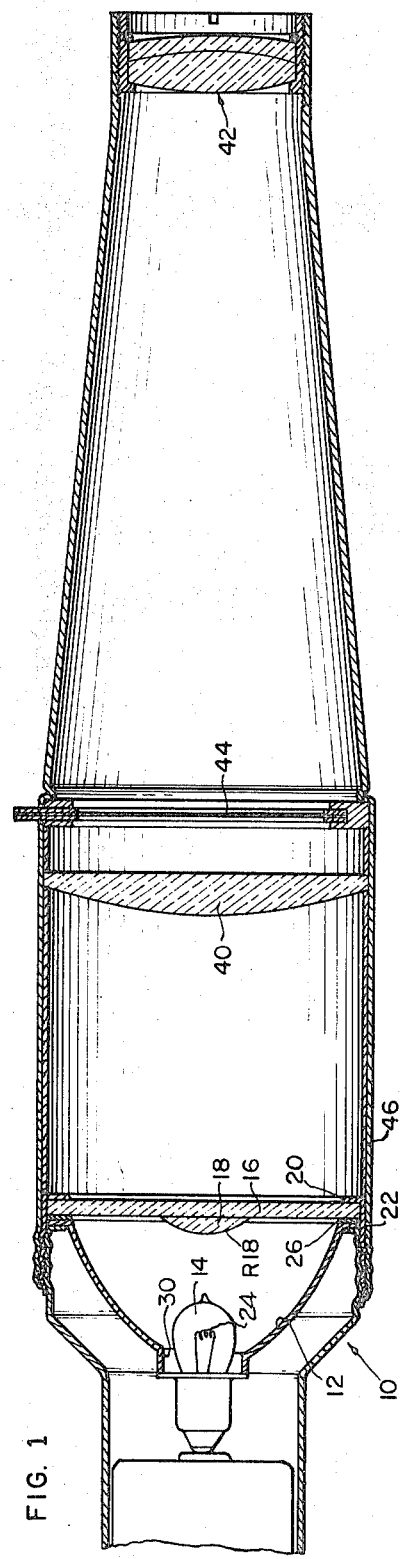
Figure 2:
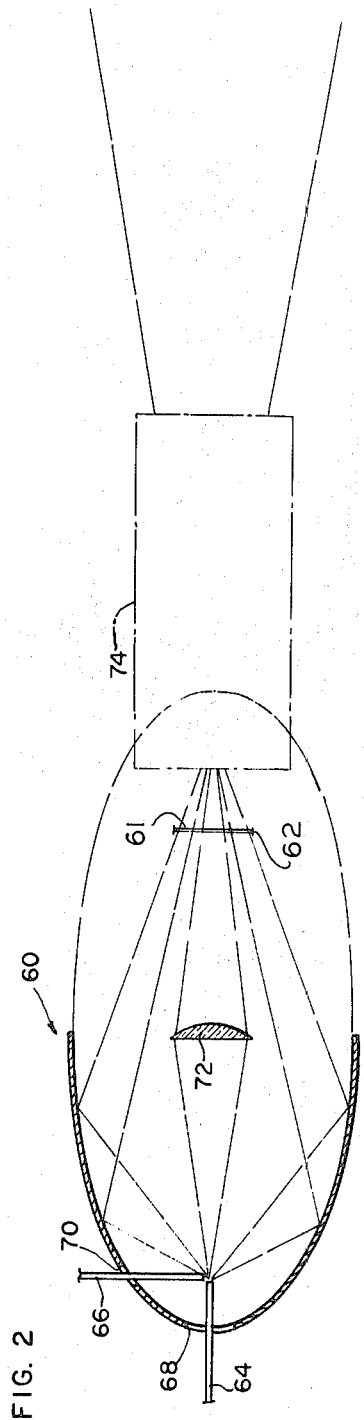

A complete understanding of the invention may be obtained from the following detailed description of shadowless projection systems forming specific embodiments thereof, when read in conjunction with the appended drawings, in which:

FIG. 1 is a view of a shadowless projection system forming one embodiment of the invention; and FIG. 2 is a view of a shadowless projection system forming an alternate embodiment of the invention.

Referring now in detail to the drawings, there is shown in FIG. 1 a flashlight slide projector system including a flashlight 10 having a conventional parabolic reflector 12, a conventional light source or lamp 14 and a cover glass 16 carrying a small central convex-plano spherical compensating lens 18 cemented to the central portion of the cover glass, and held by a rim 20 of a conventional holding ring 22 of the flashlight. The lens 18 has a spherical surface R18 of a radius such that the focal point of the lens is at filament 24 of the lamp with light from the filament being collimated by the lens. A shim 26 may be provided if necessary to position the lens 18 so that it is focused on the filament at its left side and transmits the light collimated from its right side. The diameter of the lens 18 is such as to just fill the area which would otherwise be shadowed because of the central opening 30 in the reflector 12 through which the lamp extends.

A field lens 40 focuses the parallel light from the reflector 12 and lens 18 into a known projection lens 42 focused on a transparency 44 such as a slide or a film at the aperture or holder of a projector tube 46 mounted on the flashlight. The flashlight head contains the small bulb or lamp 14 positioned at the focal point of the parabolic reflector 12 so that the light emitted in all directions from the bulb filament 24 is directed by the reflector in a parallel beam from the flashlight. However, the central hole 30 in the reflector which admits the bulb produces a dead spot in the reflected light beam. Any light which is emitted "forward" from the bulb does not reflect from the parabolic reflector and forms a diverging beam, the intensity of which diminished according to the well known inverse square law of light propagation. To fill in the dead spot from the reflector 12 and obtain a uniform beam for illumination of the slide 44, the small lens 18 with a diameter equal to that of the shadow or dead spot, is cemented onto the cover glass 16 at a distance from the bulb filament equal to the focal length of the lens 18 so that the light emitted forms a parallel beam after passing through the lens 18. This produces the necessary beam of parallel light to fill in the shadow from the hole 30 in the reflector. When the flux densities striking the lens 18 and the reflector 12 are equal, the resulting beams will be of the same intensity.

It is a well understood property of a parabolic reflector to form a parallel beam of light when a small light source is placed at its geometrical focal point. However, the focal lengths of zones of a parabolic reflector vary with the height of the zone. A ray reflected on the axis has a focal length equal to the geometrical focus. As the height from the axis increases, the focal length for that zone increases. This change in focal lengths at different zones is coma, the aberration which limits the useful field of a telescope having a parabolic mirror. The focal length of any ray is the distance from the geometrical focal point of the parabola to the point of reflection on the parabola of that ray. The light is diminishing by the inverse square law from the source to the reflector. Therefore, the outer parts of the reflector receive less light and hence reflect less light than the inner zones. The best balance for even intensity across the beam is produced when the small lens 18 gives a beam of the same intensity as an intermediate zone of the reflector. This then requires the focal length of the small lens to equal that of an intermediate zone of the reflector 12.

The amount of spherical aberration produced by the lens depends upon which way the light passes through it. The lens would normally be mounted with the plane side toward the bulb if the bulb had uniformly spherical ends. However, undesirable refractions produced by a projecting tip 50 of the prefocused bulb or lamp 14 introduce apparent negative spherical aberration which the high positive spherical aberration produced by mounting the lens as shown will tend to compensate.

In the conventional slide projector an image of the light source is focused by the condensing lens system at or near the position of the projection lens. The rays of light from all portions of the slide then funnel through the projection lens and give even illumination to the whole picture.

In the present invention a parallel beam of light would leave the reflector 12. The portion of this beam that passed through the corners of the slide 44 would be partly obstructed by the edge of the projection lens 42, thus giving poor illumination to the corners of the picture. The field lens 40 focuses this parallel beam to or near the projection lens, thereby equalizing the corner illumination as in the conventional system. The projection lens may be a lens of any of the standard projection lens types, or the simple achromatic lens shown. Also, any desirable focal length may be used by picking the focal length of the field lens to suit.

In one constructed embodiment of the projection system of FIG. 1, the radius of the surface R18 was 9.5 mm., the axial thickness of the lens 18 was 2.7 mm., the diameter of the lens 18 was 13 mm., the index of refraction for the sodium D line was 1.52 and the Abbe dispersion coefficient was about 59.0. For the field lens 40, its front surface R40 had a radius of 100 mm., its rear surface was plano, its axial thickness was 6 mm., its index of refraction for the sodium D line was 1.52, its Abbe dispersion coefficient was about 59.0, and it was spaced about one-half of an inch from the transparency 44, the lens 18 being spaced about 3.5 inches from the transparency 44. The geometrical focus of the reflector was about 6.33 mm. The objective lens 42 was a conventional, known projection lens adjustable axially to focus the image on the screen and having a focal length slightly shorter than that of the field lens 40.

EMBODIMENT OF FIG. 2

The shadowless projection system shown in FIG. 2 forming an alternate embodiment of the invention is similar to the projection system but has a light or condenser system 60 which focuses its light upon a film or transparency 61 at an aperture or film gate 62, whereas the flashlight 10 produces an afocal beam. The light system 60 includes an elliptical reflector having a pair of carbon electrodes 64 and 66 extending through holes 68 and 70 in the reflector and forming an arc of light at one focal point of the elliptical reflector. A small compensating plano-convex lens 72 is axially positioned so as to fill the otherwise shadowed portion of the light from the electrodes with one focal point being the arc and the other focal point of the lens 72 being in a known projection lens 74, which can be focused and which images the transparency on a screen (not shown). The lens 72 is plano-convex and may have an index of refraction for the sodium D line of 1.52, and an Abbe dispersion coefficient of about 59.0 The lens system 60 is ideal for frame sizes larger than the usual 35 mm. film.

The above projection systems provide high, even intensity, shadowless illumination with light sources of low power, and are compact, easily carried and inexpensive.

It is to be understood that the above-described arrangements are simply illustrative of the application of the principles of the invention. Numerous other arrangements may be readily devised by those skilled in the art which will embody the principle of the invention and fall within the spirit and scope thereof.

What is claimed is:
1. In a shadowless optical system,
    a concave mirror having a central hole and a focal point,
    a light source extending through the hole for creating light at the focal point to form a beam with a shadow from the hole,
    and a lens mounted forwardly of the mirror to receive light directly from the source for forming a central beam of a diameter equal to that of the shadow, thus eliminating it and giving a total beam of relatively uniform cross-sectional intensity,
    the mirror being parabolic,
    the lens having a diameter equal to that of the shadow and having a focal length intermediate the axial and marginal focal lengths of the parabolic mirror and positioned forwardly of the mirror so its focal point coincides with the light source.
2. In a shadowless optical system,
    a concave mirror having a central hole and a focal point,
    a light source extending through the hole for creating light at the focal point to form a beam with a shadow from the hole,
    and a lens mounted forwardly of the mirror to receive light directly from the source for forming a central beam of a diameter equal to that of the shadow, thus eliminating it and giving a total beam of relatively uniform cross-sectional intensity,
    the mirror being elliptical to form a convergent beam,
    the lens having a diameter equal to that of the shadow and a focal length equal to the focal length of an intermediate zone of the mirror for focusing a convergent beam of light at the same distance as the beam from the mirror is focused.
3. The shadowless optical system of claim 2 wherein the mirror and the lens both focus at a second focal point of the elliptical mirror.
4. In a shadowless optical system,
    a concave mirror having a central hole and a focal point,
    a light source extending through the hole for creating light at the focal point to form a beam with a shadow from the hole,
    and a lens mounted forwardly of the mirror to receive light directly from the source for forming a central beam of a diameter equal to that of the shadow, thus eliminating it and giving a total beam of relatively uniform cross-sectional intensity,
    the mirror being parabolic, the lens being focused on the focal point of the mirror, the lens having a focal length equal to the focal length of an intermediate zone of the parabolic mirror and being mounted forwardly of the mirror with the focal point of the lens coincident with the light source.

References Cited
UNITED STATES PATENTS

| | | | |
|---|---|---|---|
| 2,338,078 | 12/1943 | Wood | 240—10.6 |
| 2,478,336 | 8/1949 | Stein et al. | 353—43 |
| 2,764,058 | 9/1956 | Ellis | 353—43 |
| 1,260,439 | 3/1918 | Ott | 240—41.3 X |
| 1,750,319 | 3/1930 | Keith | 240—41.3 X |
| 2,273,447 | 2/1942 | Ohl | 240—41.3 X |
| 2,282,167 | 5/1942 | Cullman | 240—41.3 |
| 3,395,272 | 7/1968 | Nicholl | 240—41.3 |

NORTON ANSHER, Primary Examiner

R. M. SHEER, Assistant Examiner

U.S. Cl. X.R.

353—43; 240—10.68